United States Patent [19]

Dalton, Jr. et al.

[11] 4,421,530

[45] Dec. 20, 1983

[54] PROCESS FOR REMOVING OXYGEN FROM MIXED GAS STREAMS USING A SWING ADIABATIC ABSORPTION-ISOTHERMAL DESORPTION CYCLE

[75] Inventors: Augustine I. Dalton, Jr., Allentown, Pa.; John J. Sheridan, III, Somerville, N.J.; David A. Zagnoli, Fleetwood, Pa.

[73] Assignee: Air Products and Chemicals, Inc., Allentown, Pa.

[21] Appl. No.: 417,296

[22] Filed: Sep. 13, 1982

[51] Int. Cl.³ ............................................. B01D 53/04
[52] U.S. Cl. .......................................... 55/26; 55/62; 55/66; 55/74; 423/219
[58] Field of Search ............... 55/18, 25, 26, 58, 62, 55/66, 68, 74, 75; 423/219, 262, 579

[56] References Cited

U.S. PATENT DOCUMENTS

| | | | |
|---|---|---|---|
| 2,450,276 | 9/1948 | Fogler et al. | 423/219 X |
| 2,523,549 | 9/1950 | Axe | 423/219 X |
| 2,810,454 | 10/1957 | Jones et al. | 55/66 X |
| 2,874,030 | 2/1959 | Dennis | 423/219 X |
| 2,909,410 | 10/1959 | Fedorko | 423/219 X |
| 2,944,627 | 7/1960 | Skarstrom | 55/62 X |
| 3,055,732 | 9/1962 | Delassus et al. | 423/219 |
| 3,176,444 | 4/1965 | Kiyonaga | 55/62 X |
| 3,237,379 | 3/1966 | Kant et al. | 55/62 X |
| 3,323,288 | 6/1967 | Cheung et al. | 55/62 X |
| 3,361,531 | 1/1968 | Erb et al. | 423/219 |
| 3,430,418 | 3/1969 | Wagner | 55/62 X |
| 3,636,679 | 1/1972 | Batta | 55/62 X |
| 3,960,769 | 6/1976 | Munzner et al. | 423/579 X |
| 3,969,481 | 7/1976 | Murray et al. | 423/219 |
| 3,980,763 | 9/1976 | Mullhaupt | 423/219 X |
| 3,986,849 | 10/1976 | Fuderer et al. | 55/25 |
| 3,996,028 | 12/1976 | Golovko | 55/58 |
| 4,011,306 | 3/1977 | Fox, Jr. | 423/579 |
| 4,025,605 | 5/1977 | Dalton, Jr. et al. | 423/240 |
| 4,026,680 | 5/1977 | Collins | 55/208 X |
| 4,032,617 | 6/1977 | Gay | 423/579 X |
| 4,077,780 | 3/1978 | Doshi | 55/26 |
| 4,194,892 | 3/1980 | Jones et al. | 55/58 |
| 4,203,958 | 5/1980 | Snarski | 423/351 |
| 4,234,322 | 11/1980 | Meyer et al. | 55/18 |
| 4,239,509 | 12/1980 | Bligh | 55/66 |
| 4,299,719 | 11/1981 | Aoki et al. | 252/188 |
| 4,366,085 | 12/1982 | Ikegami et al. | 423/219 X |

Primary Examiner—Robert H. Spitzer
Attorney, Agent, or Firm—Geoffrey L. Chase; E. E. Innis; J. C. Simmons

[57] ABSTRACT

An adiabatic-isothermal swing absorption process is disclosed for the removal of essentially all oxygen contained in an inert gas stream. The oxygen is absorbed from an inert gas stream adiabatically on to a dioxygen absorbent and then desorbed from the absorbent isothermally by the use of external heat. The process method utilizes at least two switching beds of the dioxygen absorbent in which one bed is in an absorbing mode while the other bed is in a desorbing mode.

11 Claims, 2 Drawing Figures

EQUILIBRIUM OXYGEN ISOTHERMS FOR FLUORAMINE

PROCESS FOR REMOVING OXYGEN FROM MIXED GAS STREAMS USING A SWING ADIABATIC ABSORPTION-ISOTHERMAL DESORPTION CYCLE

TECHNICAL FIELD

The present invention is directed to a process for the removal of essentially all oxygen from an inert gas such as nitrogen or argon. More particularly, the invention is concerned with the rigorous removal of oxygen from impure inert gas streams which are contaminated with minor amounts of oxygen. Typically, such an impure inert gas stream would be an oxygen-containing argon stream from a cryogenic air separation process.

BACKGROUND OF THE PRIOR ART

The removal of oxygen from inert gas streams such as impure argon or impure nitrogen is impractical when exceedingly low concentrations of oxygen are present in such inert gases. Conventional purification or separation techniques such as cryogenic distillation, pressure swing adsorption and vacuum swing adsorption are impractical for the removal of minor or trace quantities or oxygen from a major gas stream. The commercial removal of oxygen in minor quantities in inert gases, such as argon, face severe limitations, such as unfavorable economies of scale, limiting physical laws of thermodynamic equilibria and the impaired reversibility of prior art chemical processes for extracting the trace quantities of oxygen from major gas streams.

For instance, the removal of trace oxygen by the Deoxo process can only be practically achieved on a large scale. The prior art Deoxo process involved the removal of oxygen from argon by the reaction of the oxygen with added hydrogen over a catalyst. The gas must then be dried of the resulting water and excess hydrogen must be separated from the product gas stream. Because of the difficulty and expense in performing these diverse operations, the Deoxo process has only been utilized in a centralized manner in which various sources of oxygen-containing inert gas or argon have been shipped to a central processing plant for later redistribution.

Cryogenic separation techniques are exceedingly unfavorable for the removal of trace amounts of oxygen from argon in light of the particularly low temperature necessary for such a separation, as well as the close boiling points of such gases as oxygen and argon. This is exemplified in the commercial environment wherein few air separation facilities provide substantially pure, oxygen-free, argon.

The prior art has utilized physical adsorbents, such as molecular sieve beds, for the removal of oxygen from inert streams, such as argon or nitrogen. However, the physical adsorption technique is dependent upon thermodynamic equilibria. This approach, therefore, is relevant only to mixed gases wherein high concentrations of the impurity gas, i.e. oxygen, exists and minor or trace amounts of impurity gases in the separated components can be tolerated.

The use of Salcomine, a dioxygen absorbent, for the production of oxygen from air is taught in U.S. Pat. No. 2,450,276. The patent describes a process in which heat and vacuum are necessary to desorb the product oxygen from the Salcomine absorbent. In U.S. Pat. No. 2,523,549, Salcomine is used to remove oxygen from a hydrocarbon stream. The Salcomine is utilized in beds for alternating absorption duty. The patent teaches that the beds should be operated at a controlled temperature and the beds are desorbed with the assistance of a hot purge gas at up to 300° F.

In U.S. Pat. No. 2,810,454, oxygen is removed from an impure argon stream by adsorption on a molecular sieve bed. The adsorption bed is refrigerated during the adsorption cycle and is heated and subjected to a purge gas during the desorption cycle.

U.S. Pat. No. 4,011,306 discloses the use of fluoramine, a dioxygen absorbent, for the separation of a product oxygen from an air stream for use in airplanes and other similar utilities. The dioxygen absorbent bed is cooled during the absorption cycle and is heated up to 200° F. during the desorption cycle. In addition, the cycle of absorption is intermittently interrupted to heat the absorption beds to a high 390° F. temperature to volatilize inerts captured in the absorbent. A purge of air or nitrogen is utilized to remove the latter inerts.

In U.S. Pat. No. 4,239,509, a molecular sieve adsorbent is utilized to remove nitrogen and oxygen from an argon stream.

Additional patents of general interest to the subject invention include: U.S. Pat. No. 2,874,030; U.S. Pat. No. 2,909,410; U.S. Pat. No. 3,055,732; U.S. Pat. No. 3,361,531; U.S. Pat. No. 3,969,481; U.S. Pat. No. 3,986,849; U.S. Pat. No. 3,996,028; U.S. Pat. No. 4,025,605; U.S. Pat. No. 4,077,780; U.S. Pat. No. 4,194,892; U.S. Pat. No. 4,203,958; U.S. Pat. No. 4,234,322; and U.S. Pat. No. 4,299,719.

The prior art processes for removing minor or trace quantities of oxygen from impure inert gas streams, such as argon or nitrogen, via chemical complexing or absorption suffer from the problems of expensive, complex separation systems and energy intensive regulation by refrigeration or heating of the absorbent at various stages of the process cycle for removing oxygen from the inert gas streams. The advantage in the present invention is found in overcoming many of these drawbacks and in using the inherent energy in the absorption system to reduce the amount of energy input required for the removal of oxygen from mixed gas streams, such as an oxygen contaminated argon or nitrogen gas stream. In particular, the advantage of the present invention is lower energy requirements for rigorous removal of minor quantities of oxygen.

BRIEF SUMMARY OF THE INVENTION

The present invention comprises a process for the rigorous removal of the component of oxygen from an oxygen-containing, impure inert gas stream. Relevant gas streams include argon or nitrogen which are contaminated with oxygen. The process involves the absorption of oxygen from an inert gas stream on a dioxygen absorbent in a plurality of absorbent beds in an adiabatic-isothermal swing process to produce an inert gas stream of reduced oxygen content. The absorbent beds are shell and tube types through which heating and cooling fluids pass as required in various steps of the present invention. During the absorption step on a particular dioxygen absorbent bed, the absorbent temperature is allowed to rise adiabatically due to the exothermic heat of absorption, but the absorption is terminated short of oxygen breakthrough from the bed. The heat stored in the absorbent is then utilized to assist the desorption of the chemically bound oxygen in the dioxygen absorbent, which desorption is accomplished by removing the oxygen at constant pressure by the isothermal heating of the bed during the desorption step. The stored heat of absorption and an amount of heat equal to the heat of oxygen desorption supplied by an external heat exchange fluid affects a favorable equilibria shift in order to remove the oxygen from the dioxygen absorbent. A portion of the product inert gas is utilized to repressurize the off-line absorbent bed prior to switching such bed back on-line for absorption duty.

Preferably, the dioxygen absorbent may contain a high heat capacity additive, such as particulate metal, in order to further increase the heat capacity of the absorbent bed.

The dioxygen absorbent is a metal chelate comprising a central metal atom surrounded by various organic constituents, the entire molecule of which can bond reversibly with gaseous oxygen in which the oxygen to oxygen bond is preserved.

Advantageously, the dioxygen chelate is selected from a cobalt chelate, such as Salcomine or Fluroamine.

An advantage of the present invention is the absence of need for mechanical temperature regulation during the oxygen absorption step.

Another advantage of the present system is the use of the heat of absorption retained in the absorption beds during the adiabatic absorption step to reduce the amount of external heat necessary to assist in the desprtion of oxygen after the absorption step is terminated in any particular bed. In particular, use of external heat to effect isothermal desorption allows for desorption at greater than ambient pressures, thereby eliminating a previous requirement for a vacuum pump.

It is also an advantage of the present system to use chemical absorbents such as dioxygen metal chelates which form complexes with oxygen in order to remove even trace amounts of oxygen from mixed gas streams.

DETAILED DESCRIPTION OF THE INVENTION

Figure 1:
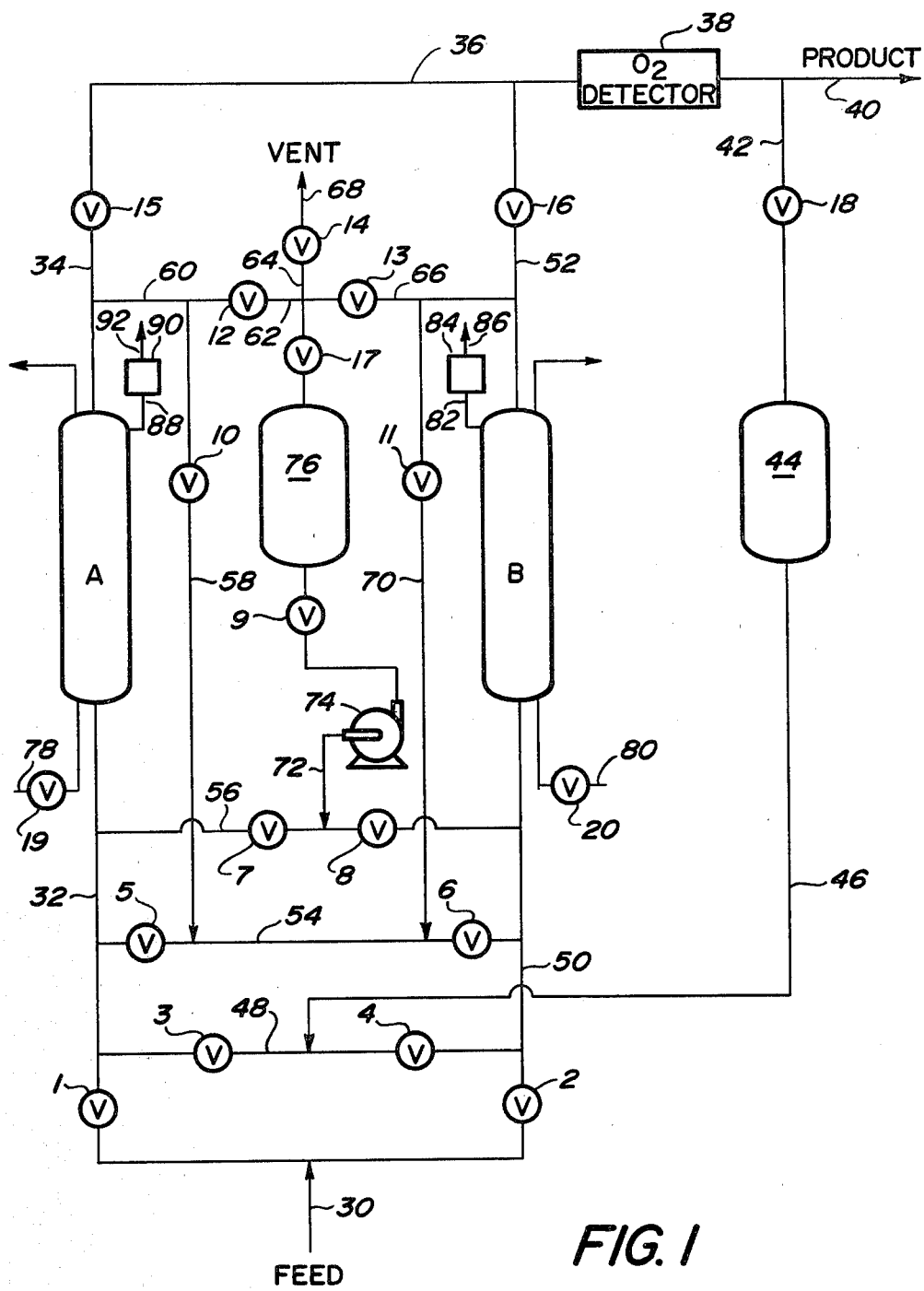
FIG. 1 represents a schematic flow scheme of a preferred embodiment of the subject adiabatic-isothermal swing absorption process.

The present invention will now be described in greater detail with reference to the drawing identified above. FIG. 1 shows a two absorbent bed system for the utilization of the preferreed embodiment of the present invention. It should be noted that although this embodiment describes the invention with respect to two alternating or switching beds, it is within the contemplation of the invention to have any reasonable number of switching beds within the limits of a realistic capital expenditure. Each bed, A and B, contains the chemical absorbent comprising a dioxygen chelate which when exposed to an oxygen-containing gas chemically combines with that oxygen to form a dioxygen complex resulting in a gas phase of reduced oxygen content.

The dioxygen absorbent which is used in the packed beds of the present invention comprises a complex of a transition metal in a chelate structure which can reversibly and exothermically bind gaseous oxygen wherein the oxygen to oxygen bond is preserved. Within the scope of this invention, the dioxygen metal chelate terminology refers to those solid Group III through Group VIII transition metal oxygen carriers or chelates that specifically bind molecular oxygen to form a dioxygen complex. The metal chelate, prior to its absorption of molecular oxygen, does not contain the two bonded oxygens which give it its dioxygen nomenclature. After absorption of molecular oxygen gas onto the chelate, a true dioxygen chemical complex exists in which the oxygen is bound in one or more of the following forms:

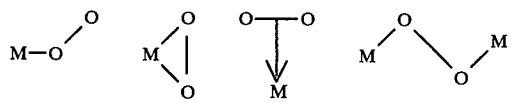

The dioxygen chelates, depending upon their structure, can be utilized as particulate solids themselves or as solids or they can be utilized in the form of liquids formulated with inert carriers or packing. Two particularly preferred dioxygen chelates forming a complex with oxygen are the metal cobalt chelates with the common names Salcomine and Fluoroamine. This chemically reversible absorption is illustrated by the following cobalt chelate:

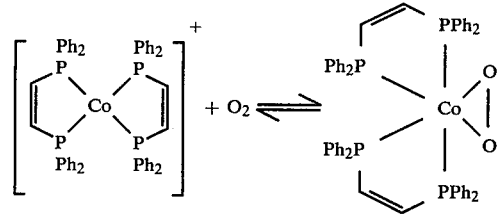

Table 1, below, identifies a number of other dioxygen chelate absorbents which form complexes with oxygen which can be utilized as the chemical absorbent in the process of the present invention. Similar compounds are further defined in J. E. Lions, "Transition Metal Complexes as Catalysts for the Addition of Oxygen to Reactive Organic Substrates", in *Aspects of Homogeneous Catalysis*, R. Ugo (Ed.) Volume 3, Reidel, Boston.

TABLE 1

1. 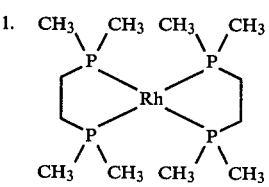

TABLE 1-continued

2. 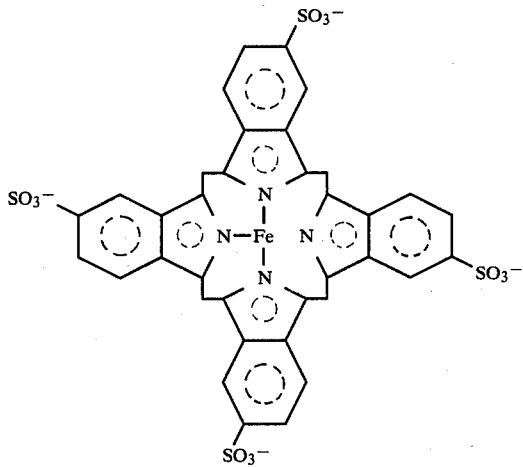

3. 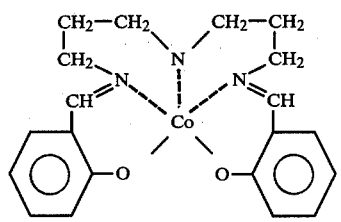

4. 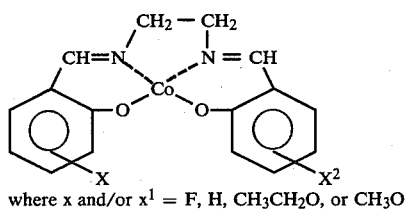

where x and/or $x^1$ = F, H, $CH_3CH_2O$, or $CH_3O$

5. 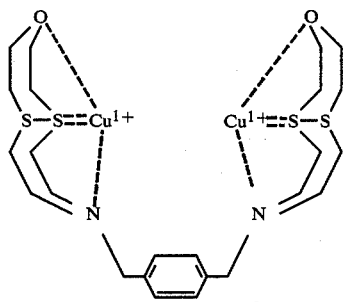

which is equivalent to $(L\ Cu_2)^{2+}$
where L = 1,4-bis-(1-oxa-4,10-dithia-7-azacyclododecan-7-ylmethyl) benzene 6. $(Mo^{II})_2$* $SiO_2$
   *covalently bonded
7. iron porphyrin, when bound to polymers such as polystyrene The heat buildup in the dioxygen absorbent beds of the present invention is dependent upon a number of variables, such as the flow rate of the mixed stream of inert gas to be processed, the oxygen content of that gas, and the particular dioxygen metal chelate species which is utilized in the bed. In order to allow for the freedom of adiabatic absorption wherein heat is not extracted from the system and is, in fact, retained in the system by insulation techniques, it is necessary to design the absorbent beds so that the heat stored in the absorbent during adsorption does not decompose the dioxygen chelate. Control of the heat of absorption can be handled in two ways; the beds can be designed to be of sufficient size to adequately disperse the heat over a large volume, or the beds can include a high heat capacity material which is admixed with the dioxygen chelate absorbent. The former technique can potentially be capital intensive. Therefore, the preferred manner for designing absorbent beds for the present process is to incorporate a high heat capacity material with the particular dioxygen absorbent. The high heat capacity material should be an inert particulate composition such as copper filings or aluminum oxide ($Al_2O_3$). The inert high heat capacity material may be mixed with the dioxygen chelate in a predetermined proportion so as to dissipate the heat and thereby control the temperature rise of the dioxygen chelate during an absorption step. The dioxygen chelate can be physically supported on the inert high heat capacity material. This is particularly beneficial in the case of a liquid dioxygen chelate, which requires absorption on a carrier particle in order to be utilized in a packed bed which will allow adequate gas permeation. In this manner, the carrier particle can do double duty as both a carrier and a high heat capacity material. In addition to simple admixture of the heat capacity material and the chelate, the heat capacity material may be mixed with the dioxygen chelate and encapsulated or bonded as an integral system using appropriate polymeric materials.

In contrast to the fully isothermal systems of the prior art wherein the temperature developed from the heat of absorption in an absorption bed is controlled through external cooling by heat exchange, the present invention allows the absorbent temperature to vary between prescribed limits dependent only on the amount of exothermic heat which is developed during the adiabatic absorption step, which leads to a significant reduction in both the size of the heat exchanger and the cooling demand. In this manner, the absorption of oxygen is performed in a fully adiabatic manner (as is shown in path AB of FIG. 2). Unlike the prior art, this temperature rise of the absorbent is not considered a disadvantage. To the contrary, the temperature rise will assist in the subsequent isothermal desorption. During the desorption, the present invention utilizes an isothermal desorption step (as shown in path BC of FIG. 2) wherein a heated heat exchange fluid is passed in a heat exchange manner through the desorbing bed. However, in contrast to the prior art fully isothermal processes, the present process has less energy requirements because some of the heat is already contained in the absorbent material from the adiabatic absorption step. The combined heat of absorption and heat from the heat exchanger fluid introduced during the desorption step assist the constant pressure, isothermal desorption in removing the chemically bound oxygen from the dioxygen complex. During this isothermal desorption step, the oxygen-containing gas phase is removed from the absorber at a prescribed rate. After isothermal desorption is complete, the bed is cooled (as shown by path CA, FIG. 2) by a cold heat exchange fluid to return the bed to its starting temperature and to ready it for another absorption step.

In the present invention, operational control of the absorption step is maintained simply by the feed gas stream entering the absorbent beds. The stream flow rate and the quantity of oxygen to be absorbed control the temperature rise of any particular absorbent bed which is on line for its absorption step. Since the objective of this invention is to produce an inert gas of reduced oxygen content, before oxygen breakthrough in the absorbent bed is reached, the feed is cut off to that particular absorbent bed and is redirected or switched for adiabatic absorption to another bed connected in parallel to the first bed. The off-line bed undergoes isothermal desorption using the exothermic heat of absorption retained during the adiabatic absorption step, and the heat delivered to the absorbent by the heat exchange fluid. After desorption is complete, the bed is then cooled to the original temperature existing at the start of the absorption step. The detection of oxygen breakthrough, or near oxygen breakthrough, is essentially the only mechanical process control necessary for the absorption step of the process. The desorption step is controlled in an isothermal manner by the introduction of a heating fluid commensurate with oxygen desorption. At start up of the process of the present invention, it may be beneficial to cool the absorption beds to subambient temperature. This can be accomplished, for example, by passing a subambient gas stream or a temperature reducing gas stream through each absorbent bed prior to its going on-line. For example, argon or nitrogen may be introduced into the beds and cycled through a standard gas refrigeration loop to reduce the temperatures to subambient conditions. Alternately, a cooling heat exchange fluid can be passed through the tubes (shell) of the absorbers.

In order for the adiabatic step of the present invention to operate without permanently degrading the dioxygen complex due to the high temperatures possible with the heat evolved during absorption, the absorption beds must be designed with respect to the isotherms of the dioxygen complex intended for use. Exemplary of the selection of the proper operating parameters for a system of the present invention is the following discussion concerning Fluoramine.

Figure 2:
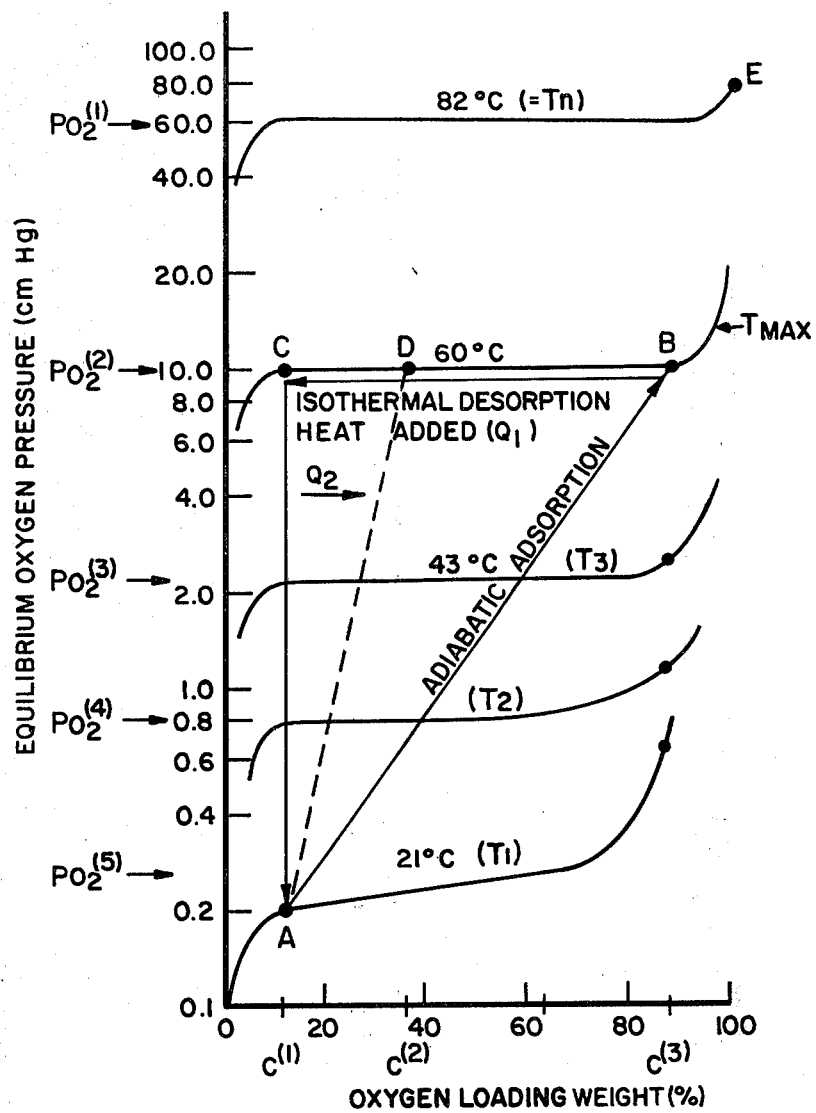
FIG. 2 is a graph of the equilibrium isotherms for Fluoramine.

A family of equilibrium isotherms for the Fluoramine/$O_2$ system are shown in FIG. 2. The isotherm lable $T_{max}$ (60° C.) represents one reasonable value for the maximum allowable temperature for Fluoramine.

An adiabatic path is defined as a straight line connecting two isotherms, for example path AB of FIG. 2. Oxygen absorption proceeds along the adiabatic path, in the direction of increasing temperature and oxygen pressure; the converse is true for adiabatic oxygen desorption, but not for isothermal desorption, the desorption path of this invention; e.g. BC of FIG. 2. The two end points of the adiabatic path are important for two reasons:

(a) The starting point (i.e., pt A) establishes the level of oxygen removal or purity of effluent stream since the oxygen concentration of the effluent stream cannot be less than the oxygen partial pressure in equilibrium with complex at the starting point. For example, with a starting point of A, the $O_2$ purity of the effluent stream is approximately $PO_2^{(5)}/PT$, where PT is the pressure of the effluent stream.

(b) The end-point (i.e., B) of the adiabatic path establishes the upper temperature of the system, a temperature that must be below the "maximum allowable temperature" of the complex for reasons discussed above.

There are two means for adjusting the end-point of the adiabatic path.

1. The end-point lies on (or below) the isotherm in equilibrium with the oxygen pressure of the feed. For example, with an oxygen pressure of $PO_2^{(1)}$ in the feed, the end-point would lie along isotherm $T_n$. The end-point would lie along $T_{max}$ for an oxygen pressure of $PO_2^{(2)}$ in the feed. Therefore, low pressure and/or oxygen lean streams lead to lower end-point temperatures. In some cases, the feed pressure may be reduced to avoid an excessive end-point temperature.

2. The slope of the adiabatic line can be decreased through the addition of inert ballast of high heat capacity. Such ballast acts as a sink for the heat of absorption, thereby protecting the absorbent complex from being exposed to excessive temperatures. For example, starting at point A (of FIG. 2) for a feed partial pressure of $PO_2^{(5)}$, point D is the end-point. However, the capacity of the complex is only $C^{(2)}-C^{(1)}$. Starting with point A, the $O_2$ capacity of the complex can be increased by adding inert ballast to shift the end-point to B on isotherm $T_{max}$, which yields an increased capacity of $C^{(3)}-C^{(1)}$.

It is worth noting that with an end-point of B, further increases in the $O_2$ pressure of the feed will not raise the temperature of the system above $T_{max}$ since the complex at B is essentially saturated with $O_2$. The system increases isothermally towards point E, with minor heat evolution. Therefore, adiabatic paths that end at the so-called "$O_2$ saturation point" represent cycles that can advantageously tolerate increases (fluctuations) to the oxygen feed pressure, such as might occur in commercial practice, without leading to degradation of the complex.

Therefore, the upper end-point for a given complex can be controlled by (1) adjusting the feed pressure, if necessary, and/or (2) introducing a heat sink, inert filler, into the absorbent bed. The lower-end of the cycle is fixed by the purity requirements of the particular application. In those cases requiring rigorous removal of oxygen from relatively dilute (oxygen-lean) streams, such as the application involving purification of a crude argon stream, an inert filler is not required since the temperatures of the two end-points lie well below $T_{max}$ of Fluoramine.

The unique features of the subject invention are that no external heat exchange is required for the absorption step since the step is operated in an adiabatic mode, with the heat generated in the exothermic oxygen absorption step stored for subsequent use in the thermic oxygen desorption step which is carried out isothermally with additional outside heat. Thermal excursions during the adiabatic step can be controlled to within prescribed limits to ensure that the temperature of the complex does not exceed the "maximum allowable temperature" of the complex.

With reference to FIG. 1 and Table 2, the process will now be operationally described for argon production from a crude argon gas stream containing a minor amount of oxygen using a Fluoramine absorbent. It is contemplated that the invention is equally relevant to other oxygen-containing inert gas streams, such as nitrogen streams. Typically, an impure argon stream containing 95 to 97% argon with the remaining content of the gas stream being oxygen is processed as an off stream from a cryogenic air separation unit. For the present invention, such as impure argon gas stream is introduced in feed line 30 as shown in FIG. 1. By the appropriate opening of valves 1 or 2 and the utilization of branch lines 32 or 50, the impure argon feed stream can be directed to one of two absorbent beds A and B. In each of these shell and tube absorbent beds, a dioxygen chelate absorbent material is placed in the shells (tubes) in either an unsupported or supported manner as discussed above and can be in admixture with a high heat capacity material. Before the introduction of the impure argon gas stream into either of the beds at start up, it is preferred that the beds be at subambient temperature conditions. If a subambient temperature feed stream is being processed, no preliminary cooling is necessary. However, in the event that the feed stream is at ambient conditions, an initial cooling stream can be introduced for the limited purpose of establishing a subambient temperature starting pint from which the absorption will run adiabatically. Alternately, a cooling heat exchange fluid is passed through the tubes (shell) to achieve subambient conditions. During continuous operation, the beds will be returned to subambient temperatures after desorption and regeneration by cooling with a cold heat exchange fluid. This simple bed cooling after desorption is to be distinguished from cooling which must occur during the isothermal adsorption step practiced in a number of prior art processes.

In the event that valve 1 is opened and valve 2 is closed, the argon feed stream will proceed through line 30 and 32 to absorbent bed A. During passage of the impure argon stream through the absorbent bed A, oxygen is chemically absorbed onto the metal chelate which is packed in said bed, the chelate is converted to a dioxygen complex or compound, and an argon stream of reduced oxygen content is produced. The adsorbent bed undergoes an adiabatic temperature rise due to the exothermic heat of absorption of the oxygen. This rise in temperature is allowed to occur during the absorption step. Absorption in bed A continues until just before oxygen breakthrough at the downstream end of said bed. An argon product of 99.999% purity exits through line 34 and open valve 15. Such purities are impractical to obtain with prior art absorption systems. The argon product passes through line 36 and oxygen guard detector 38 before being collected at product storage 40. The oxygen guard detector is a safety device which protects against an upstream malfunction in the switching beds, which could lead to oxygen contamination of the product. If oxygen is determined to exist above a desired level at the oxygen guard detector 38, the system is automatically shut down for correction of any malfunctioning. Oxygen breakthrough in absorbent bed A is ascertained by the sensing of a slipstream of line 88 by oxygen sensor 90. The slipstream is then vented in line 92. The sensor 90 can be any standard oxygen detecting device which is presently known and available in the art of gas processing.

When oxygen detection occurs at sensor 90, the feed is switched to absorbent bed B by the appropriate control valves. In this case, valve 1 is closed and valve 2 is opened, as well as others shown in Table 2. The impure argon feed stream then passes through line 30 and 50 before entering absorbent beds B. An argon product of 99.999% purity then exits through line 52, open valve 16, oxygen detector 38 and line 36 before being collected in product storage 40. At the same time as absorption is switched to bed B, a pressurized purge gas from vessel 76 is passed through valve 9, compressor 74, line 72, open valve 7 and line 56 in order to remove any argon gas which is contained residually in bed A. This gas is vented through line 60, open valve 10, line 58, line 54 and open valve 6 to be blended with the feed stream in line 50.

After this purging of feed argon from bed A, bed A is then desorbed by passage of hot heat exchange fluid through line 78 and valve 19 to the shell (tubes) of constant pressure through line 60. The oxygen passes through open valve 17 and is collected in an oxygen purge vessel 76. When vessel 76 is full, valve 17 is closed and valve 14 is opened such that the residual oxygen being driven off of bed A is delivered through line 64, valve 14 and line 68 to be vented.

A portion of the argon product from absorbent bed B is bypassed in line 42 through valve 18 and collected in pressurization vessel 44. This pure argon gas in vessel 44 is then available for repressurization duty at appropriate times in the overall process sequence.

At the end of the desorption step for bed A, it is necessary to cool the absorbent to the initial temperature of the cycle by passing a cooling refrigerant or heat exchange fluid to the shell (tubes) through line 78 and valve 19. The pressurized pure argon gas collected in pressurization vessel 44 is then delivered through line 46, line 48 and open valve 3 to be introduced in line 32 into desorbed and cooled bed A. This brings bed A up to at least 50% of the pressure of the feed gas stream to avoid pressure surges when bed A is brought back on stream.

With bed A now in a fully regenerated condition, the feed stream is switched from bed B, which has approached oxygen breakthrough, and is now returned to bed A via open valve 1 and line 32. Breakthrough in bed B is determined in an identical fashion to breakthrough in bed A, wherein bed B has a slipstream line 82, oxygen sensor 84 and a vent line 86. As the feed gas is processed through bed A, an oxygen purge gas in vessel 76, which was originally supplied from bed A during its desorption step, is supplied through open valve 9, compressor 74, line 72 and open valve 8 through line 50 to bed B which is off-line. This oxygen purges the impure feed argon from bed B through line 66, open valve 11, line 70, line 54 and open valve 5 through line 32 to bed A.

After the feed argon has been purged, bed B undergoes isothermal desorption as described in Table 2. This is accomplished similarly as in bed A and consists of opening valve 20 and allowing heating fluid to pass through line 80 to the shell (tubes) of bed B in order to isothermally drive oxygen off the dioxygen complex through line 66 and valves 13 and 17 and into vessel 76. When sufficient pressure is obtained in vessel 76, valve 17 is closed and valve 14 is opened such that the residual oxygen being desorbed from bed B is vented through line 68. After desorption is complete, absorbent bed B is then cooled to the initial cycle temperature by the passage of a cooling refrigerant or heat exchange fluid through line 80 and valve 20 to the shell (tubes) of the absorber bed B. The cooled and desorbed bed B is repressurized with a supply of pure argon product from pressurization vessel 44.

This cyclic operation is continued indefinitely to provide a continuous flow of essentially oxygen free argon gas as a product. The cyclic process is controlled by the sequential opening and closing of various valves or group of valves as specifically outlined in Table 2. The first step of the steps listed in Table 2 is a start-up step and requires that vessel 76 already be filled with an oxygen purge gas as well as vessel 44 being filled with an inert gas such as argon. Aside from that start-up procedure, the sequence of valve operation identified in Table 2 is undertaken in a cyclic sequential series wherein after the last step identified in Table 2 the sequence returns to the first step identified in that table and the ensuing sequence is performed indefinitely.

TABLE 2

Step Sequence for Absorption/Desorption Cycle (Two Bed Configuration)

| Cycle | Step | Valve Positions | Purpose |
|---|---|---|---|
| 1 | A-1 (absorption)<br>B-5 (pressurization) | 1, 4, 15 Open<br>2, 3, 5, 6, 7, 8, 9, 10, 11, 12, 13,<br>14, 16, 17, 18, 19, 20, Closed | Absorb O$_2$ on Bed A and<br>pressurize Bed B with<br>product gas. |
| 1 | A-2 (purge)<br>B-1 (absorption) | 2, 6, 7, 9, 10, 16 Open<br>1, 3, 4, 5, 8, 11, 12, 13, 14, 15,<br>17, 18, 19, 20 Closed | Displace feed gas in<br>Bed A & switch feed<br>flow to Bed B. |
| 1 | A-3 (desorption)<br>76-1 (pressurization)<br>B-1 (absorption) | 2, 12, 16, 17, 19 Open<br>1, 3, 4, 5, 6, 7, 8, 9, 10, 11, 13,<br>14, 15, 18, 20 Closed | Heat Bed A and<br>evacuate to desorb O$_2$.<br>Pressurize 76. |
| 1 | A-3 (desorption)<br>B-1 (absorption)<br><br>44-1 (pressurization) | 2, 12, 14, 16, 18, 19 Open<br>1, 3, 4, 5, 6, 7, 8, 9, 10, 11, 13<br>15, 17, 20 Closed | Desorb O$_2$ from Bed A<br>and pressurize surge<br>vessel 44 with product<br>gas. |
| 1 | A-4 (cooling)<br>B-1 (absorption) | 2, 16, 19 Open<br>1, 3, 4, 5, 6, 7, 8, 9, 10, 11, 12, 13, 14<br>15, 17, 18, 20 Closed | Cool Bed A to starting<br>bed temperature. |
| 1 | A-5 (pressurization)<br>B-1 (absorption) | 2, 3, 16 Open<br>1, 4, 5, 6, 7, 8, 9, 10, 11, 12, 13,<br>14, 15, 17, 18, 19, 20 Closed | Pressurize Bed A with<br>product gas. |
| 2 | A-1 (absorption)<br>B-2 (purge) | 1, 5, 8, 9, 11, 15 Open<br>2, 3, 4, 6, 7, 10, 12, 13, 14, 16,<br>17, 18, 19, 20 Closed | Switch feed flow to<br>regenerated Bed A and<br>initiate purge of<br>Bed B. |
| 2 | A-1 (absorption)<br>B-3 (desorption)<br>76-2 (pressurization) | 1, 13, 15, 17, 20 Open<br>2, 3, 4, 5, 6, 7, 8, 9, 10, 11, 12, 14,<br>16, 18, 19 Closed | Heat Bed B and<br>evacuate to desorb O$_2$.<br>Pressurize 76. |
| 2 | A-1 (absorption)<br>B-3 (desorption)<br><br>44-1 (pressurization) | 1, 13, 14, 15, 18, 20 Open<br>2, 3, 4, 5, 6, 7, 8, 9, 10, 11<br>12, 16, 17, 19 Closed | Absorb O$_2$ on Bed A<br>and Desorb O$_2$ from Bed B.<br>Pressurize 44. |
| 2 | A-1 (absorption)<br>B-4 (cooling) | 1, 15, 20 Open<br>2, 3, 4, 5, 6, 7, 8, 9, 10, 11, 12<br>13, 14, 16, 17, 18, 19, Closed | Absorb O$_2$ on Bed A<br>Cool Bed B to starting<br>bed temperature. |

The invention process has been set forth using a two bed configuration as shown in FIG. 1. Multiple bed configurations can be contemplated within the scope of the present invention and these will alter some aspects of the operation, such as the duration of cycle time and the overall sequence of switching from bed to bed during the process operation, but the novel use of a dioxygen chelate in an adiabatic absorption and isothermal desorption swing process will still be achieved as demonstrated above. The important aspect of this invention is the use of packed beds connected in parallel, which beds contain dioxygen complex forming metal chelates wherein one bed is undergoing adiabatic absorption while another bed is undergoing isothermal desorption. As a consequence of this adiabatic operation, the energy penalties associated with removal of the heat of absorption as in isothermal absorption processes are not present. The use of isothermal desorption, in which an external heat source is combined with the heat collected and stored in the absorbent during the adiabatic absorption, allows for the elimination of vacuum pumping equipment needed in conventional pressure swing absorption processes.

The use of a portion of the desorbed oxygen containing gas as a purge medium to remove the residual void-volume of feed gas retained in the absorption bed provides an integral means for insuring that the feed gas is subject to the purification treatment. In this manner, losses of the desired or product gas are reduced to an absolute minimum.

The novel absorption and purification system of the present invention is contemplated for the removal of oxygen from inert gas streams. An exemplary gas stream which would benefit from this process is the argon stream extracted in a typical cryogenic air separation unit. However, other oxygen-contaminated inert gas streams could also be processed through the system of the present invention. Nitrogen streams, which must have rigorous oxygen removal, could also be the recipient of processing in this system. The feed gas, which can be introduced into the system of the present invention, should have an oxygen partial pressure or concentration which is sufficiently low such that the equilibrium temperature of the complex corresponding to the oxygen partial pressure of the feed is less than the maximum temperature limit of the particular dioxygen complex in the absorbent bed which is used unless added ballast is present to dissipate this heat. The temperature of the feed gas stream can be at ambient temperature conditions, but ideally, a gas feed stream at subambient temperatures would allow for greater bed temperature rise and therefore, minimize the necessary volume of the bed and the requirement for a high heat capacity additive to the bed.

The present invention provides a low energy, low capital expense process for the rigorous removal of oxygen from inert gas streams. The novel combination of a metal chelate, dioxgen-forming absorbent in conjunction with an adiabatic absorption-isothermal desorption swing process sequence provides a practical way to remove minor or trace amounts of oxygen from inert gas streams where application of the product inert gas requires it to be rigorously oxygen-free. The invention has been specifically described with reference to the production of an essentially pure argon product. However, other inert oxygen-containing gases can also be purified in this process from gases having oxygen contamination. Therefore, the scope of the invention should not be deemed to be limited by the specific description utilized above, but rather the scope of the invention should be ascertained from the claims which follow.

We claim:

1. A process for removing oxygen from an inert gas stream containing oxygen by adiabatic absorption of the oxygen on a dioxygen absorbent and isothermal desorption of the oxygen during dioxygen absorbent regeneration wherein the process is designed to operate below the temperature of decomposition of the absorbent comprising the steps of:

(a) introducing an oxygen-containing inert gas stream into a first bed of a dioxygen absorbent at a temperature chosen on an isotherm of the particular dioxygen absorbent so as to allow adiabatic absorption to proceed without reaching the temperature of degradation of said absorbent;

(b) adiabatically absorbing essentially all of the oxygen content of said inert gas stream on said dioxygen absorbent, while removing an essentially oxygen-free inert gas from said bed;

(c) terminating said absorption on said first bed before oxygen therethrough in said bed;

(d) switching the flow of the inert gas stream to a second dioxygen absorbent bed for adiabatic absorption of the oxygen content of said stream, while removing an essentially oxygen-free inert gas from said bed;

(e) desorbing said first bed isothermally by supplying a high temperature heat exchange fluid to said bed to drive absorbed oxygen off said dioxygen absorbent;

(f) cooling said first bed to the initial absorbent temperature;

(g) representing said first bed with essentially pure oxygen-free inert gas from the downstream flow of product gas from said second bed;

(h) terminating said absorption on said second bed before oxygen breakthrough in said bed;

(i) switching the flow of the inert gas stream back to the first bed, while desorbing the second bed as described in step (e) above;

(j) cooling said second bed to the initial absorbent temperature;

(k) repressurizing the second bed with essentially pure oxygen-free inert gas from the downstream flow of product gas from said first bed;

(l) cyclically repeating steps (a) through (k) for the production of an essentially oxygen-free inert gas.

2. The process of claim 1 wherein the inert gas stream is an argon stream contaminated with oxygen.

3. The process of claim 1 wherein the dioxygen absorbent is selected from the class comprising metal chelates of Group III—VIII metals which will bind molecular oxygen reversibly while preserving the oxygen to oxygen bond of the oxygen molecule.

4. The process of claim 1 wherein the dioxygen absorbent is Salcomine or its derivatives.

5. The process of claim 1 wherein the absorbent beds of dioxygen chelate also contain a high heat capacity material.

6. The process of claim 5 wherein the dioxygen absorbent and the heat capacity additive are provided in the absorbent beds in simple admixture.

7. The process of claim 5 wherein the high heat capacity material is selected from the group consisting particulate copper and particulate alumina.

8. The process of claim 5 wherein the dioxygen absorbent is physically supported on the heat capacity material in the absorbent bed.

9. The process of claim 5 wherein the dioxygen absorbent and the heat capacity additive are encapsulated or bonded together in a polymer matrix in said absorbent bed.

10. The process of claim 1, 2, 3, 4 or 5 wherein the absorption in said beds is initiated at subambient temperatures during initial start up of each bed.

11. The process of claim 1, 2, 3, 4 or 5 wherein a portion of the oxygen from the desorption of one bed is used to purge the residual inert feed gas from the void volume of the other bed during the subsequent desorption of said other bed such that the residual inert feed gas is passed to another absorbent bed in the absorption step.

* * * * *

UNITED STATES PATENT AND TRADEMARK OFFICE
CERTIFICATE OF CORRECTION

PATENT NO. : 4,421,530
DATED : December 20, 1983
INVENTOR(S) : Augustine I. Dalton, Jr., et al It is certified that error appears in the above—identified patent and that said Letters Patent are hereby corrected as shown below:

Column 13, Line 42
　　Delete "representing" and substitute therefor -- repressurizing --

Column 14, Line 27
　　Delete "consisting" and substitute therefor - comprising --

Signed and Sealed this

Twenty-third Day of October 1984

[SEAL]

Attest:

GERALD J. MOSSINGHOFF

Attesting Officer

Commissioner of Patents and Trademarks